US010705820B2

(12) United States Patent
Madrid et al.

(10) Patent No.: US 10,705,820 B2
(45) Date of Patent: Jul. 7, 2020

(54) METHOD AND APPARATUS FOR SECURE MULTI-CYCLE VEHICLE SOFTWARE UPDATES

(71) Applicant: FORD GLOBAL TECHNOLOGIES, LLC, Dearborn, MI (US)

(72) Inventors: Daniel Joseph Madrid, Livonia, MI (US); Sangeetha Sangameswaran, Canton, MI (US); Jason Michael Miller, Woodhaven, MI (US); Xin Ye, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/422,662

(22) Filed: Feb. 2, 2017

(65) Prior Publication Data
US 2018/0217831 A1   Aug. 2, 2018

(51) Int. Cl.
| | |
|---|---|
| *H04W 12/06* | (2009.01) |
| *G06F 21/44* | (2013.01) |
| *G06F 8/65* | (2018.01) |
| *H04L 12/40* | (2006.01) |
| *H04W 12/10* | (2009.01) |
| *H04L 29/08* | (2006.01) |
| *H04L 9/08* | (2006.01) |
| *H04L 9/32* | (2006.01) |
| *H04L 29/06* | (2006.01) |

(52) U.S. Cl.
CPC ............ *G06F 8/65* (2013.01); *H04L 9/0891* (2013.01); *H04L 9/3247* (2013.01); *H04L 12/40013* (2013.01); *H04L 63/08* (2013.01); *H04L 63/123* (2013.01); *H04L 67/34* (2013.01); *H04W 12/06* (2013.01); *H04W 12/10* (2013.01); *G06F 2221/2143* (2013.01); *H04L 2012/40215* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 5,708,712 A | 1/1998 | Brinkmeyer et al. | |
| 5,774,550 A | 6/1998 | Brinkmeyer et al. | |
| 2004/0064699 A1* | 4/2004 | Hooker | H04L 9/3271 713/170 |
| 2005/0252963 A1* | 11/2005 | Adams | G06F 12/1458 235/382 |
| 2009/0292913 A1* | 11/2009 | Kune | H04L 63/123 713/150 |

(Continued)

*Primary Examiner* — Daxin Wu
(74) *Attorney, Agent, or Firm* — Michael Spenner; Brooks Kushman P.C.

(57) ABSTRACT

A system includes a processor controlling a vehicle module (VM) in communication with a telematics control unit (TCU) over a bus. In this embodiment, the processor is configured to receive an authentication request, including a counter value, from the TCU. The processor is also configured to respond to the authentication request based on comparison of the counter value to a stored counter value stored by the VM. The processor is further configured to receive a command corresponding to the authentication request and including the counter value, responsive to the approved authentication request and process the command based on comparison of the counter value to the stored counter value.

9 Claims, 5 Drawing Sheets

(56) References Cited

U.S. PATENT DOCUMENTS

| | | | |
|---|---|---|---|
| 2010/0228673 A1* | 9/2010 | Pesl | G06F 21/10 |
| | | | 705/54 |
| 2013/0222109 A1* | 8/2013 | Lim | G06F 21/73 |
| | | | 340/5.8 |
| 2015/0121071 A1* | 4/2015 | Schwarz | H04L 63/12 |
| | | | 713/168 |
| 2016/0013934 A1* | 1/2016 | Smereka | G06F 21/572 |
| | | | 713/171 |
| 2016/0062871 A1* | 3/2016 | Kuroda | G06F 11/00 |
| | | | 717/125 |
| 2016/0264071 A1* | 9/2016 | Ujiie | B60R 16/023 |
| 2017/0244706 A1* | 8/2017 | Ren | H04L 63/0807 |
| 2018/0183591 A1* | 6/2018 | De Laat | H04L 9/12 |

* cited by examiner

METHOD AND APPARATUS FOR SECURE MULTI-CYCLE VEHICLE SOFTWARE UPDATES

TECHNICAL FIELD

The illustrative embodiments generally relate to a method and apparatus for secure multi-cycle vehicle software updates.

BACKGROUND

With more and more vehicle modules having functional, updateable software installed thereon, customers have come to expect that various software on varied modules is kept up to date and functional. Since vehicles do not usually have a persistent network connection, keeping the software updated currently relies on: a) downloaded over-the-air (OTA) updates; b) taking the vehicle to a dealer periodically to update the software; or c) the customer manually installing updates.

As original equipment manufacturers (OEMs) add ever more electronic control units (ECUs) to a vehicle, the desirability of OTA updates grows. OTA updating allows the OEM to control and update a vast array of software on the vehicle, while ensuring compatibility between updates. Because many updates can have an effect on the drivability of the vehicle, the vehicle often processes these updates during key-off states, where the owner is not driving the vehicle. In other models, the vehicle may process updates during key-on states, which allows the vehicle to update software while being driven.

The vehicle can handle a multi-cycle update such that memory in the vehicle is erased and written over multiple key cycles, and only after the whole update is processed does the vehicle use the new software update. Until then, the vehicle continues to use the old, compatible module.

Unfortunately, the nature of these multi-cycle updates provides an opportunity for replay attacks and other malicious interference. A hacker may intercept a command to a vehicle, and attempt, at a later time, to send the command again. Since the vehicle may not have completed processing the command when the vehicle first received the command, the command is technically still a valid command. The vehicle needs to be able to distinguish between valid commands received from an approved source, and replay or other malicious commands received from someone attempting to cause an invalid or unapproved change in software.

SUMMARY

In a first illustrative embodiment, a system includes a vehicle-processor configured to receive a software update command. The processor is also configured to process the update over multiple key cycles, including processing an erase step and a write step. For each cycle until the erase command is complete, the processor is configured to send an authentication request, including a counter value. The processor is also configured to receive approval from a module for which the update is being performed, responsive to the module verifying the counter value for each cycle. The processor is further configured to send instructions to execute an uncompleted erase command to the module, responsive to the approval.

Also, in this embodiment, for each cycle until the write command is complete, the processor is configured to send the authentication request, including a counter value. The processor is also configured to receive approval from the module for which the update is being performed, responsive to the module verifying the counter value, for each cycle. The processor is further configured to send instructions to execute an uncompleted write command to the module, responsive to the approval and receive an updated counter value from the module, following completion of each of the erase and write commands. Additionally, the processor is configured to respond to an entity requesting the update with the updated counter value, each time an updated counter value is received.

In a second illustrative embodiment, a system includes a vehicle-processor configured to send an authentication request, including a counter value, to a module for a module memory-state change command. The processor is also configured to send a memory-state change command (such as, but not limited to, an erase or write command) responsive to receiving authentication, based on the sent counter value, from the module and repeat sending the authentication request and memory-state change command over multiple vehicle key cycles until the module completes the memory-state change command.

In a third illustrative embodiment a system includes a processor controlling a vehicle module (VM) in communication with a telematics control unit (TCU) over a bus. In this embodiment, the processor is configured to receive an authentication request, including a counter value, from the TCU. The processor is also configured to respond to the authentication request based on comparison of the counter value to a stored counter value stored by the VM. The processor is further configured to receive a command corresponding to the authentication request and including the counter value, responsive to the approved authentication request and process the command based on comparison of the counter value to the stored counter value.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
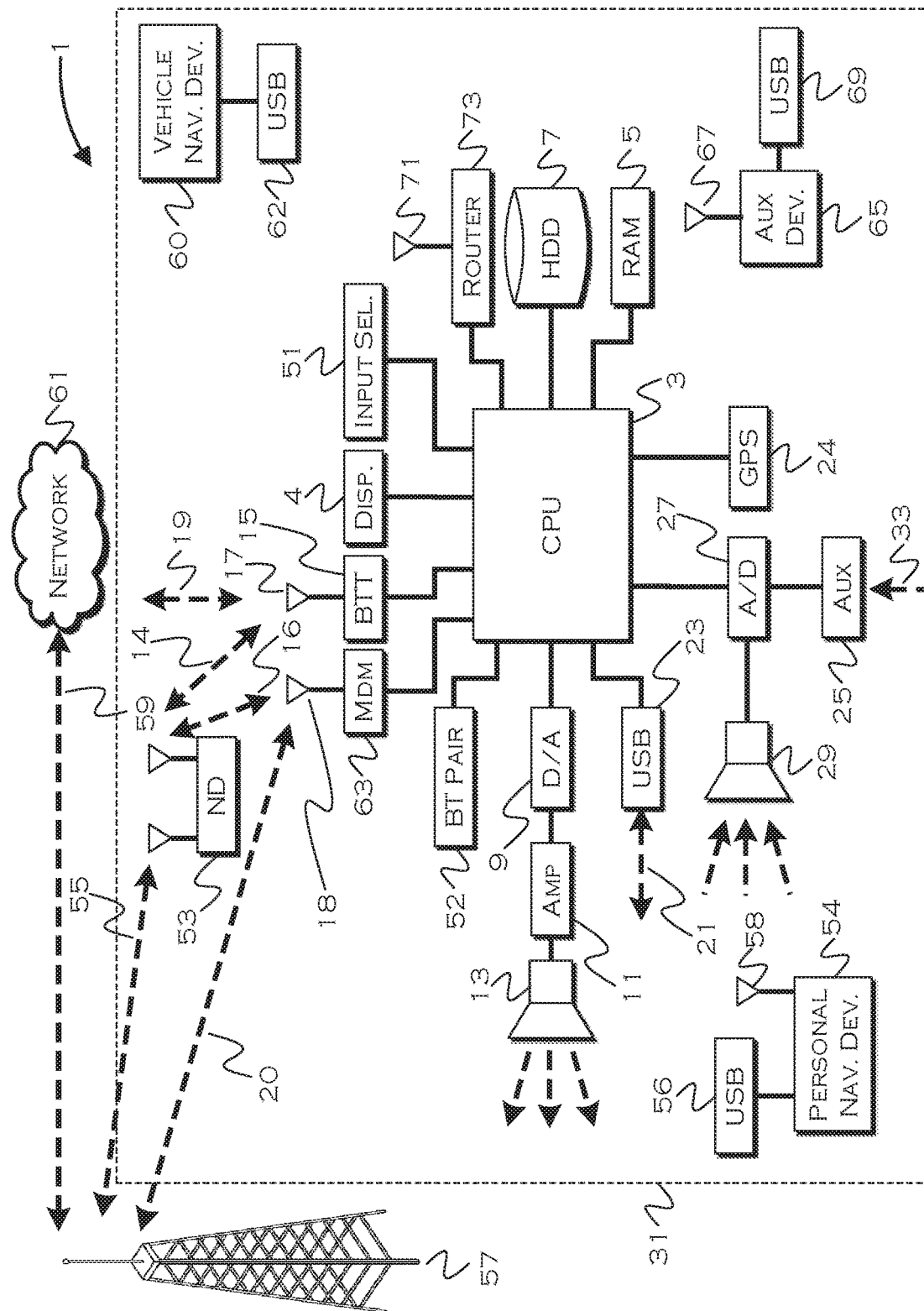
FIG. 1 illustrates a representative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs of the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WI-FI access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WI-FI and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WI-FI) or a WiMax network.

In one embodiment, incoming data can be passed through the nomadic device via a data-over-voice or data plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection.

Auxiliary device 65 may include, but is not limited to, personal media players, wireless health devices, portable computers, and the like.

Also, or alternatively, the CPU could be connected to a vehicle based wireless router 73, using for example a WI-FI (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

One method for updating vehicle software provides each ECU with two memory spaces, A and B. In this model, one of the two spaces, in this example A, stores a current usable version of the ECU software. The other space stores what will be the updated version (and an old version, until a new update comes available). In this example, space B is storing the old version.

If space A stores version 1.1 and space B stores version 1.0, and both are fully loaded into the respective storage spaces, the vehicle may use version 1.1 stored in space A until version 1.2 becomes available.

Once the vehicle receives an indication that version 1.2 is available, the vehicle may begin to process the update for the ECU. Since space B is currently storing the oldest version (1.0), the vehicle will overwrite the memory in space B with the new version 1.2. In this model, the updates are during key-on cycles, which means the vehicle may require multiple cycles to complete the update, depending on how long the update takes and how long the vehicle is being driven. Once the update is complete, the vehicle will switch to using the software in space B, which will then contain version 1.2.

A danger with the above model is that if a malicious entity could replicate a replace or delete command with respect to space B, and the vehicle had already switched to using the software in space B, the entity could essentially erase or overwrite the software designated for use. Accordingly, the illustrative embodiments provide a solution that should prevent such replay attacks from succeeding.

A brief summary of how one example of the illustrative embodiments works is as follows:

Any commands (erase, write, etc.) that can modify a module are signed by the cloud. This electronic serial number (ESN) provides a first layer of defense, since the vehicle can use the ESN for authentication. Depending on how this authentication is implemented, however, a replicator can potentially fake the signature if re-sending a copy of a previously sent command.

In this programming model, an erase or programming operation can take place over many key cycles. At each key cycle, the TCU sends an authorization to the target ECU before performing the erase or program action. This authorization step prevents someone from getting on the CAN bus and sending erase or program commands to the target ECU (since that entity will not be able to fake the TCU authentication required to process the command).

In the illustrative embodiments, every authorization command includes a counter. Both the cloud and ECU maintain the counter for each ECU, and the ECU will not honor any command with a counter that is less than the ECU's current stored counter value. This helps to mitigate/prevent replay attacks where an old command is resent by a third party.

After an erase or program command is done the TCU invalidates the authorization. This prevents authorization from being misused. Commands are signed using ESN level signing to prevent the same command from being used on a different vehicle. If the signature is missing or invalid, the ECU will not allow its memory to be modified.

Through the use of a changing counter value, a second layer (other than the ESN) of defense exists that can help stop replay attacks. Since the old (replayed) command will presumably also include an old (invalid) counter value, the vehicle (having changed the counter following completion of the command) will be free to ignore the replayed command, even if the ESN is appropriate (having been copied as part of copying the entire command for replay).

Figure 2A:
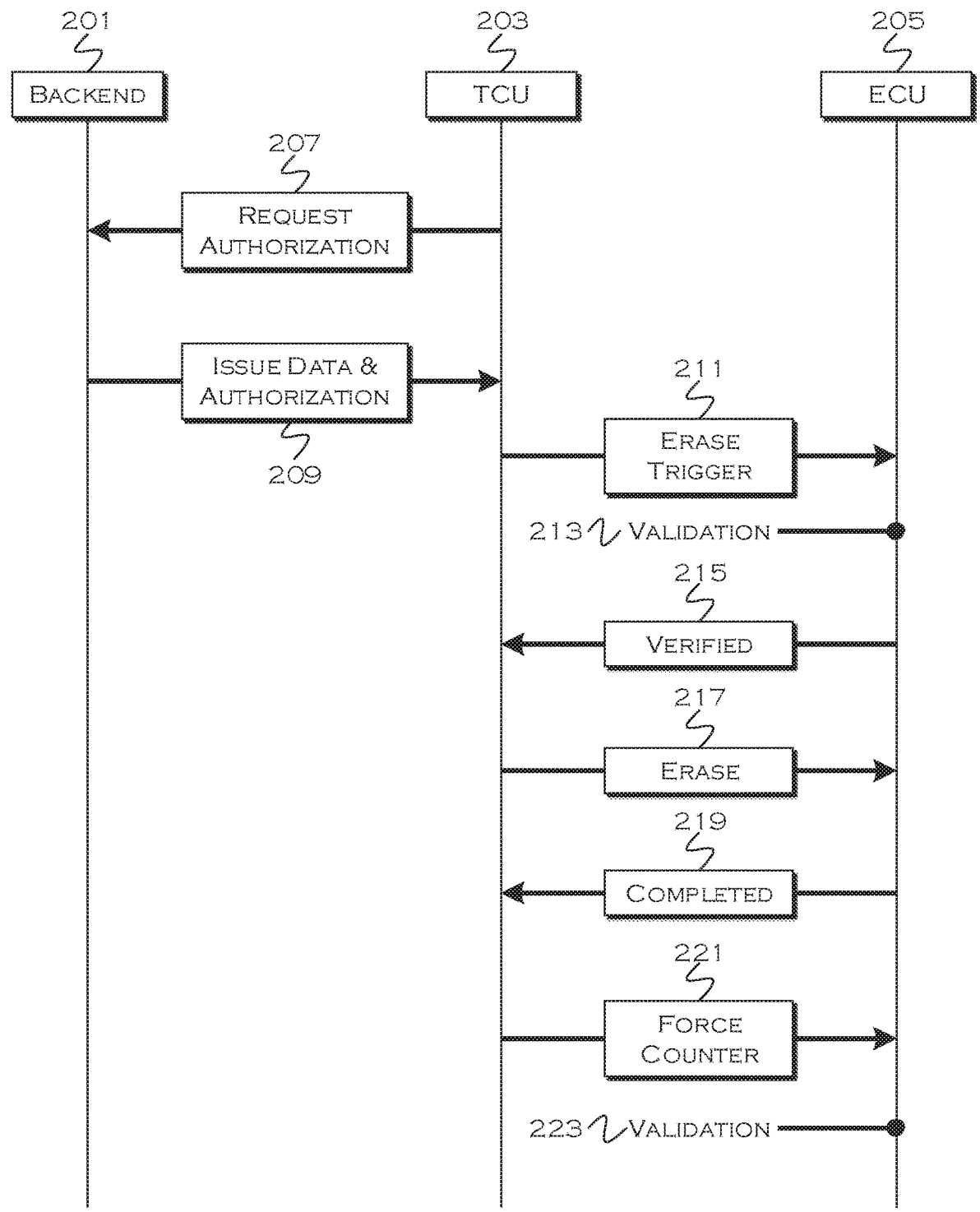
FIGS. 2A and 2B illustrate examples of a multi-cycle update flow.
Figure 2B:
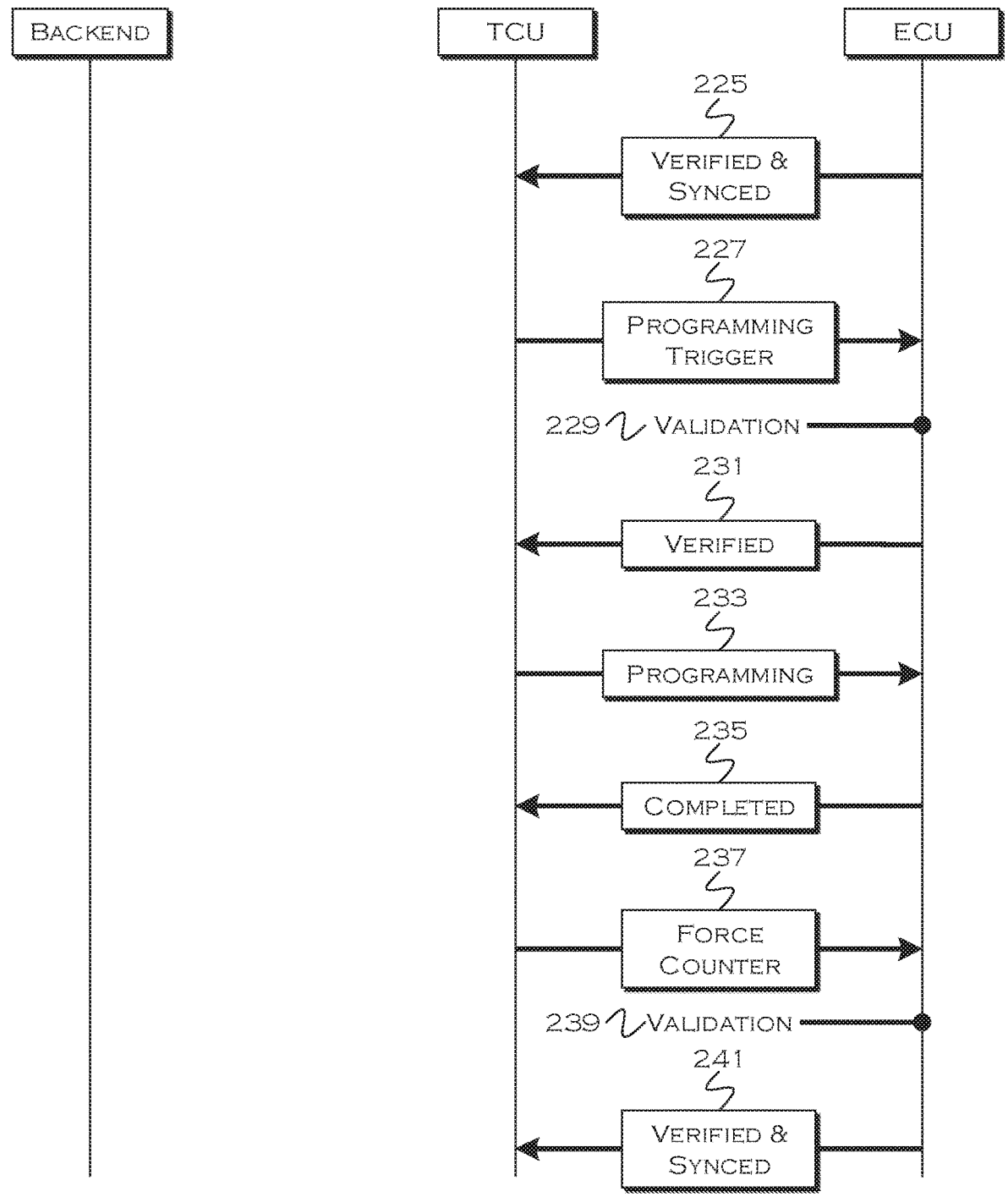

FIGS. 2A and 2B illustrate examples of a multi-cycle update flow using sync counter updates for security. In this illustrative embodiment, the TCU has received an update command that will include, for example, an erase and rewrite of storage space B (used illustratively for convenience) on an ECU. The TCU 203 requests authorization 207 from the backend 201 for, for example, erase command processing, rewrite/programming processing, and, in this case, a separate counter-sync command to change the counter state when the command processing is complete.

The backend, which can be, for example, an OEM server or other cloud system, issues 209 triggers for processing the various substantive commands (erase, write, etc.) and commands for forcing the new counter state to the ECU. In this example, the backend also signs all the commands and/or triggers, so that the TCU and/or ECU will be able to verify the authenticity of the command originator (i.e., the backend or other command issuing entity). The signatures may also be designated for a particular vehicle, so that a hacker cannot simply replay a captured command to a variety of vehicles to wreak havoc.

Once the TCU receives the signed set of triggers and commands, the TCU will begin to process the commands in the appropriate order. Here, the TCU will issue an authorization for the erase trigger and send 211 the signed erase trigger to the ECU 205. If the ECU confirms that the Erase Trigger is verified 215, the TCU can send 217 the erase command. Verification/validation 213 can include, for example, verifying the ESN, verifying the counter included with the command is not below the current counter state, and verifying any additional signature included with the command. Since both the backend and the ECU keep track of the counter, the backend will know, for a particular ECU, what counter state/value should be sent to ensure the counter value of the command meets the requirements of the ECU.

In this example, the counter value included with a command must not be lower than the current ECU counter value, and the force sync commands change the ECU counter value to a counter value that is also known by the backend that originated the force sync command.

The erase trigger 211 and erase command 217 sending sequence may be repeated by the TCU over multiple vehicle cycles until the ECU completes erasing the requested memory space 219. Since the force-sync will not occur until after the erasure is completed, the command will continue to be valid (based on signatures and counter) over all the key cycles, as the counter will not have changed. Once the ECU process the force sync command, the counter value will change, and the ECU will no longer validate the erase command because of the mismatch in counter states between the command and the ECU counter state.

Once the ECU completes 219 the erase process, the TCU sends the next command in the sequence, which, in this example, is a force sync command. In the illustrative examples, the process forces counter sync after each command is processed, which can aid in ensuring that no previous command can be replayed while the next command is processing. In other examples, a different appropriate paradigm may be used.

The TCU sends 221 the force counter command, which is also an ESN signed command that also includes a counter value for verification purposes. The ECU validates 223 the counter command, by using the old ECU counter value compared to the counter value included with the command signature. If the ECU successfully validates the command, the ECU then changes 225 the counter value on the ECU to the counter value specified by the command. In another example, the ECU may change the counter value by a known change amount or equation, in response to the command. The latter example avoids sending the new counter value, and instead essentially just instructs the ECU to move to the next counter value upon command validation.

As can be seen, at any given time the cloud/backend may not know where the TCU and ECU are in the update process. But, since the cloud/backend knows the various counter values associated with the steps of the command, having originated the force sync values, the cloud will know what a local counter value on the ECU is when either: a) the TCU reports any phase of the process as completed; and/or b) the TCU reports that the entire process is completed. Whether intermittent reporting or finalized reporting is used may be a matter of design choice and/or may be dictated by the particular available connectivity for the TCU. But, for example, even if no reporting is used, if the TCU has a policy that no new update processing will be requested until a previous update is processed, then the mere request for processing 207 will indicate to the backend that the previous commands were processed and will let the backend know that the backend-saved counter value is the valid one.

In this example, once the ECU has completed processing 225 of the force sync command, the TCU sends a signed programming trigger 227. This trigger includes the new counter value, which should still be a valid value since the force sync command would have changed the ECU counter to correspond to the new value included in the programming trigger.

The ECU validates 229 the programming trigger's ESN, counter and any other signature, and sends 231 a verification that the programming trigger is a valid request. The TCU then issues a programming 233 command for reprogramming the B storage space. Again, this may take multiple key-on cycles to complete reprogramming, and only when the reprogramming is complete does the ECU issue 235 the completed notification. Until that time, the TCU/ECU may repeat the programming trigger verification and programming command processing on each appropriate (typically successive) key-on cycle.

As before, once the ECU completes reprogramming, the TCU issues a new force counter command to change the counter state, to prevent replay of the reprogramming command. Once the TCU receives indication that reprogramming is completed, the TCU sends 237 a new force counter command. Again, this command is signed and includes a counter value for verification purposes as well. The ECU validates 239 the second force sync command and, upon successful validation, changes the ECU counter value in accordance with the command. The ECU reports 241 successful validation and synchronization back to the TCU. The TCU can report the completion of the cycle to the cloud, report the completion of each command to the cloud, or simply forego reporting, if the paradigm is such that the cloud knows that the previous command set was successful when the TCU issues a new request.

It is also worth noting that, if the "counter must be no less than the previous counter value" model is used, then even if the previous command set never completed, the backend could still issue successful commands for reprogramming at a later instance. That is, because the backend counter value will assuredly not be less than the ECU value, a new higher value from the backend will still result in a successful counter check, even if the ECU never previously processed the previous force sync commands. The subsequent force sync commands, included with the new command set, can set the ECU counter to match that of the cloud, so under this model the cloud can issue any number of instructions signed with workable counter values, knowing that eventually a force sync command will be processed that will synchronize the counters on the ECU and cloud.

Figure 3:
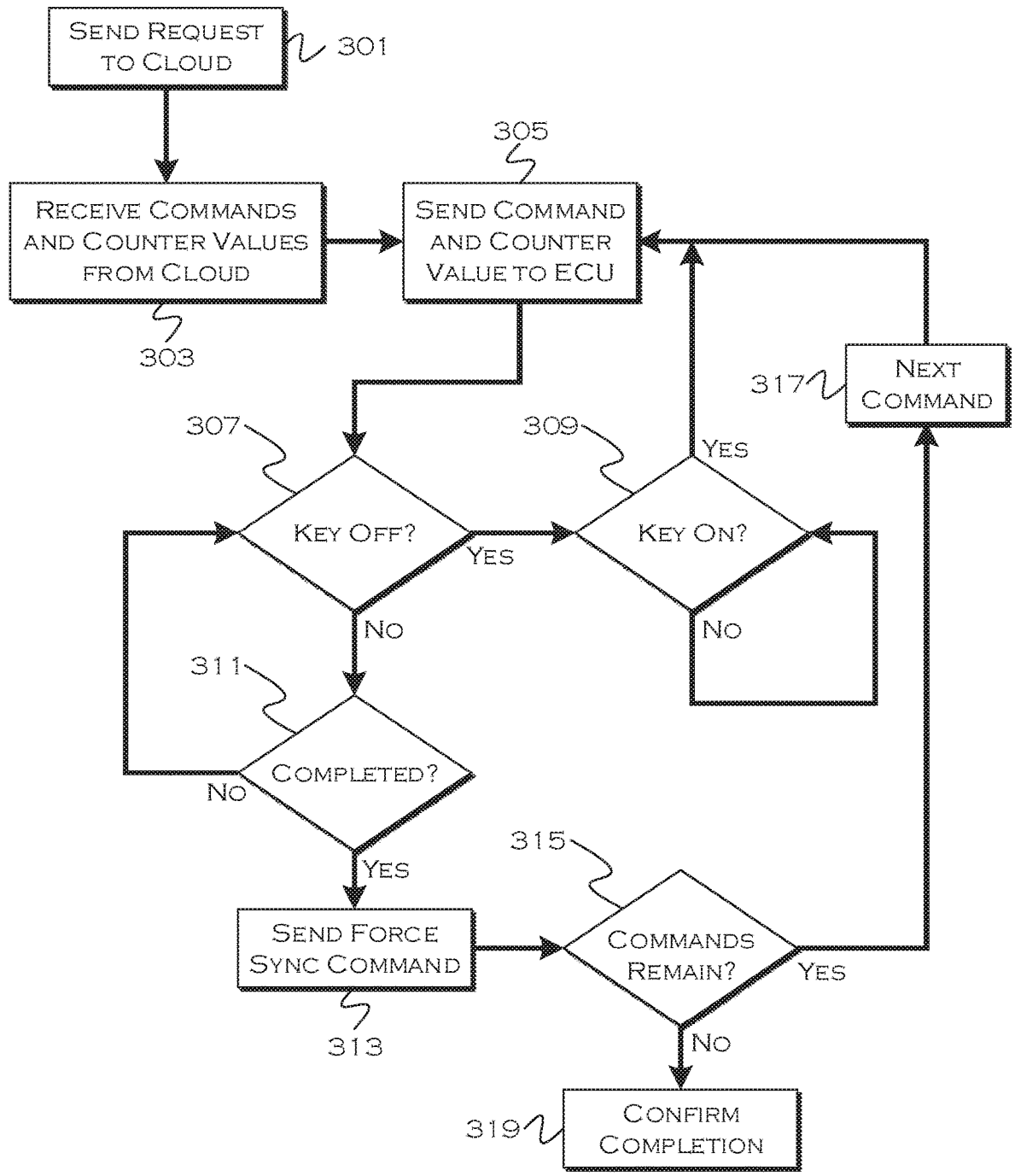
FIG. 3 illustrates a process for update handling.

FIG. 3 illustrates a process for update handling. In this example, the vehicle (for example, the TCU) sends a request to the cloud for commands and/or command processing. The cloud, which knows the counter value even though the TCU may not, responsively issues triggers for commands to be processed (which includes a counter signature for the trigger) and any desired force sync commands. Since the triggers and commands are signed, the TCU and/or ECU can validate the commands as being intended for the particular vehicle and from a particular source. Since the triggers include counter values, and since, in this example, the TCU will not issue the command for the ECU until the ECU validates the trigger for that command, the ECU can validate the commands before accepting them, ensuring that an appropriate command is only processed once (processed to completion, which can be over multiple cycles) and when it is supposed to be.

The TCU receives the signed triggers and signed commands from the cloud 303, and sends a first of the commands or triggers to the ECU 305. If the vehicle is not in a key-off state 307, the ECU processes the particular command until the command is completed 311. Although not shown in this particular figure, in the illustrative model the ECU will process a trigger for each command before the TCU issues the command, ensuring counter compliance of each command since the trigger value is provided by the cloud. Command processing continues until the command is completed 311 or the key state changes 307.

If the key state changes before the command processing completes for a particular command, then on a next key-on 309, the TCU resends the trigger to the ECU and resends the command 305 following trigger verification. Since the ECU has not changed counter states, the originally issued trigger still includes a valid counter value.

Once the command processing is complete, the TCU sends a force sync command 313, which, upon verification, forces the ECU to change the ECU counter value to match that expected by the cloud for a next-command. If any further commands remain for processing 315, the TCU selects a next command 317 and repeats the trigger/command process over cycles, followed by the force sync. This loop can continue until all commands signed and instructed by the cloud are processed. In this example, once the ECU has processed the entire command set, the TCU issues an indicator to the cloud that the commands were successfully processed 319.

Figure 4:
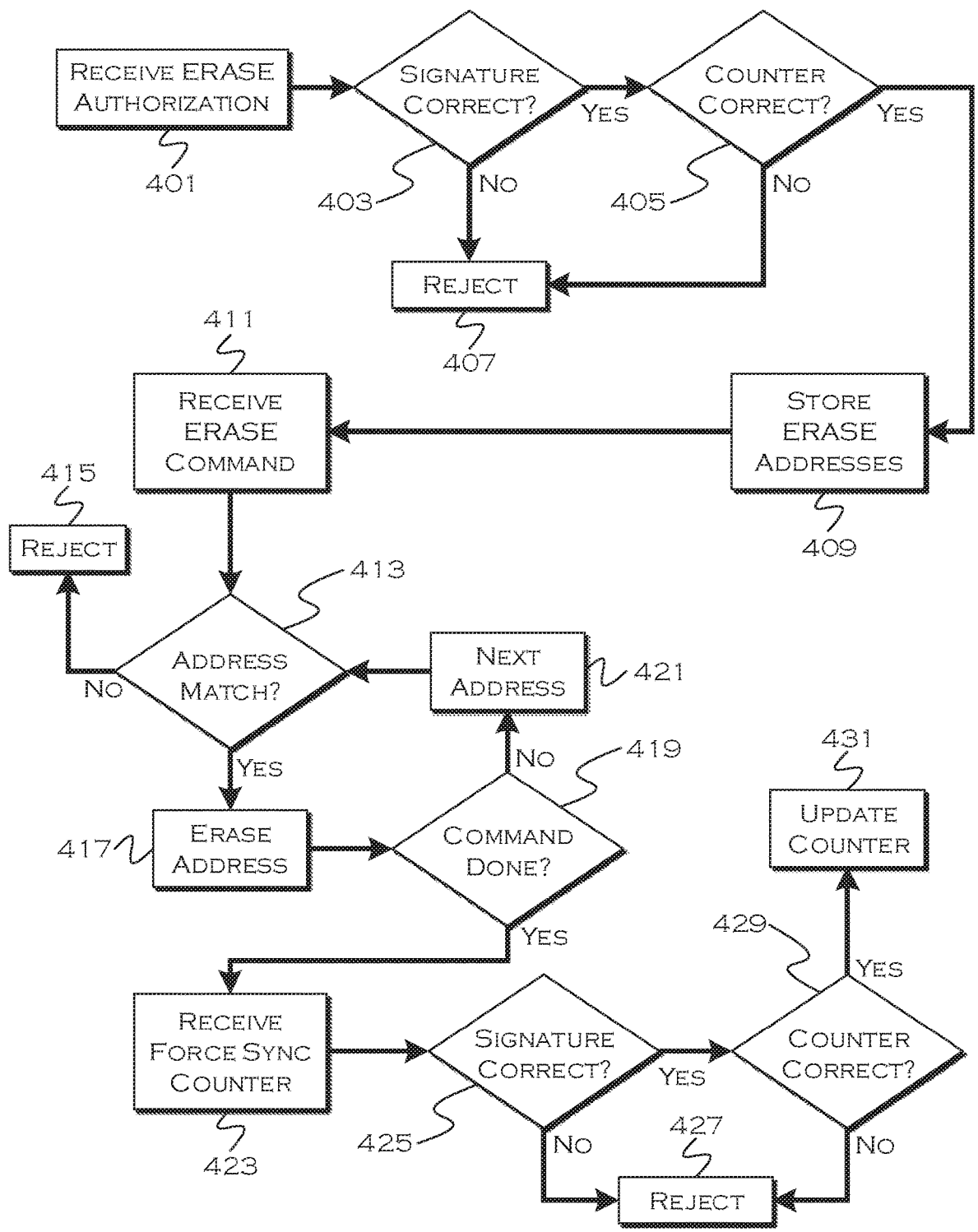
FIG. 4 illustrates a process for command handling.

FIG. 4 illustrates a process for command handling. In this illustrative example, ECU handling of an Erase command and force sync command is shown. Similar handling could be performed for write commands, and any other commands that also might employed the force-sync paradigm described herein, or the like.

Here, the ECU receives an erase authorization trigger 401 from the TCU. This trigger is an ESN signed command that includes a counter. The ECU first checks the ESN and/or other signature included with the command to verify, for example, origin and intended recipient. If the signature is correct/valid 403, the ECU checks the counter. If the signature in invalid, the ECU rejects or ignores the trigger.

The ECU also checks the counter included with the trigger 405 to see if the counter is less than a current ECU counter. In this example, the counter must simply be no less than a current ECU counter to be verified, but other models (such as matching counter values) might also be used. If the counter value is incorrect, the ECU rejects/ignores the command. If the counter value is correct, the ECU saves a series of addresses to be erased by the erase command 409. The ECU also notifies the TCU that the erase trigger was approved and responsively receives 411 the erase command from the TCU.

The erase command includes one or more addresses to be erased by the ECU. The ECU will check the included addresses against the saved addresses, and if the addresses do not match 413 (i.e., if erasure of other addresses is requested), the ECU rejects the command 415. If the addresses match, the ECU erases the data at one of the addresses 417 and, if the erase command is not finished 419 (i.e., addresses remain), the ECU moves to a next address 421 and repeats the check and erase process.

Once the ECU finishes processing the erase command, the ECU notifies the TCU that the erase command has completed. The TCU then issues a force sync command, which the ECU receives 423. Again, this is a signed command with a counter value, so the ECU verifies the signature 425, and the ECU compares the counter value to an existing ECU counter 427. If either verification attempt fails, the ECU rejects/ignores the command 427. If both values are correct, the ECU will update the counter 431 in accordance with the force sync command.

While the proposed model cannot stop all hacking attempts, the counter synchronization provides a significant protection against command replay attacks, since each command is only valid as long as the counter value included with the command is approved by the ECU. Since the ECU and backend can keep consistent and synchronized counter values, even though they may never directly communicate, it can be ensured that the backend "knows" what counter values will be accepted by the ECU, and can issue commands that should pass muster.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a vehicle module including at least an updateable memory and storing a verification counter value usable for authentication of memory-state change commands based on an authentication counter value received from outside the module;
a vehicle-processor configured to:
send an authentication request, including the authentication counter value, to a module for a module memory-state change command;
send a memory-state change command responsive to receiving authentication, based on the sent authentication counter value, from the module;
repeat sending the authentication request and memory-state change command over multiple vehicle key cycles until the module completes the memory-state change command;
responsive to completion of the memory-state change command, receiving an updated verification counter value from the module; and
updating the authentication counter value to match the updated verification counter value.

2. The system of claim 1, wherein the processor is configured to receive an update instruction comprising multiple memory-state change commands, from a remote system.

3. The system of claim 2, wherein the update instruction includes the authentication counter value.

4. The system of claim 2, wherein the processor is configured to send the updated authentication counter value to the remote system.

5. The system of claim 1, wherein the module is configured to respond affirmatively to the authentication request based on the authentication counter value received with the authentication request not being less than a stored counter value of the verification counter stored by the module.

6. The system of claim 5, wherein the module is configured to update the stored verification counter value upon completion of the memory-state change command.

7. The system of claim 6, wherein the module is configured to send the updated stored verification counter value responsive to completion of the memory-state change command.

8. The system of claim 1, wherein the memory-state change command includes a write command.

9. The system of claim 1, wherein the memory-state change command includes an erase command.

\* \* \* \* \*